United States Patent Office 3,236,804
Patented Feb. 22, 1966

3,236,804
POLYPROPYLENE STABILIZED WITH A NICKEL OR COBALT DITHIOCARBAMATE IN COMBINATION WITH A NICKEL PHENOLATE OF THIO BIS PHENOL
William F. Geigle, Springfield, Pa., assignor to Sun Oil Company, Philadelphia, Pa., a corporation of New Jersey
No Drawing. Filed Oct. 2, 1964, Ser. No. 401,262
20 Claims. (Cl. 260—45.75)

This invention relates to the stabilization of propylene polymers, and more particularly, to new compositions of matter comprising a solid crystalline polymer of propylene and an inhibitor, as well as a novel process for preparing stabilized shaped articles from said polymers. This application is a continuation-in-part of application Serial No. 73,172 filed December 2, 1960, and application Serial No. 73,173 filed December 2, 1960, each of which application is now abandoned.

Polymers which are included in the compositions of this invention are the relatively high molecular weight solid crystalline polymers of propylene. These polymers may be homopolymers or block copolymers. With regard to such block copolymers and their preparation, see for example, Church application Serial No. 700,761 filed December 15, 1957, Schneider et al. application Serial No. 90,173 filed February 20, 1961, now abandoned, and Khelghatian et al. application Serial No. 244,281 filed December 13, 1962, which applications are incorporated herein by reference.

Such polymers can be prepared by the polymerization of the olefin, or olefins, using a solid catalytic material. A catalyst which is especially effective for the polymerization of propylene to relatively high molecular weight solid polymers is the combination of a lower halide of titanium, such as titanium trichloride, and an aluminum compound having the formula $R_1R_2R_3Al$ wherein $R_1$ is hydrocarbon and each of $R_2$ and $R_3$ are the same or different hydrocarbon or halogen groups, such as aluminum triethyl, diethyl aluminum chloride or ethyl aluminum dichloride. This type of catalyst can be prepared by admixing, for example, titanium tetrachloride and aluminum triethyl in an inert solvent, such as isooctane or other hydrocarbons. This mixture acts as a catalyst for polymerizing the alpha-olefin to solid polymers. If desired, a lower halide such as titanium trichloride can be preformed, dispersed in an inert liquid, and an activator, such as one of the foregoing aluminum compounds, added. The polymerization process comprises contacting propylene with the solid catalyst, such as by passing the olefin into the liquid reaction mixture thereby to polymerize said olefin to solid polymers. Anhydrous and oxygen-free conditions are used throughout the process, since the catalyst is deactivated by contact with water or oxygen.

In addition to the foregoing, the following applications, incorporated herein by reference, illustrate block copolymer processes and catalysts suitable for the preparation of the propylene block copolymers contemplated by the present application, Jezl et al. application Serial No. 241,032 filed November 29, 1962, and Jezl et al. application Serial No. 243,613 filed December 10, 1962. Other specific catalyst systems, i.e. other metal halide or metal oxide catalyst systems, as well as other process conditions, necessary for the preparation of the propylene polymers described herein are illustrated by pages 350 through 361, pages 416 through 419, page 442 and page 453 of "Linear and Stereo-Regular Addition Polymers" by Norman G. Gaylord and Herman F. Marks, Interscience Publishers, 1959, the contents of which are incorporated herein by reference.

Propylene homopolymers and block copolymers as above-described have a crystalline melting point of from 160° C. to 170° C., a tensile strength of from 3,000 to 6,000 p.s.i. (pounds per square inch), and an average molecular weight of from 50,000 to 850,000 or more (determined by light-scattering). Usually, a mixture of crystalline and amorphous polymer is obtained. If desired, amorphous polymer can be separated from the crystalline polymer by contacting a mixture thereof with a hydrocarbon solvent, such as isooctane or n-heptane, at an elevated temperature. The amorphous polymer is substantially soluble under these conditions whereas the crystalline polymer is susbtantially insoluble. The compositions of the present invention are prepared from either crystalline or mixtures of crystalline with amorphous polymers in which the mixture contains at least 25% by weight, and preferably at least 50% by weight, of the crystalline polymer. In addition to the foregoing characteristics, the block copolymers contemplated by this invention, as aforesaid, have improved impact strength even at low temperatures.

Such polymers may be molded or otherwise fabricated to form many useful articles. However, propylene polymers are susceptible to degradation caused by heat, oxidation, mechanical working, and light (especially ultra-violet light). This degradation apparently results from free-radical formation within the polymer molecules, which formation is promoted by oxygen, heat, mechanical action, impurities (such as metals and metal compounds), and light. The free-radicals which are formed undergo further chemical reactions, resulting in undesirable chemical and physical transformations. Thus, the propylene polymers deteriorate prematurely, lose tensile strength, molecular weight and other desirable properties, such as pliability and impact strength, and become discolored and embrittled.

An object of the present invention is to provide compositions comprising the aforesaid susbtantially crystalline, isotactic, solid polypropylene and solid, substantially crystalline block polymers of propylene containing a minor quantity of a synergistic composition effective to stabilize the polymer against degradation. It is a specific object of this invention to provide compositions comprising the above-described polymers containing minor quantities of a synergistic stabilizing composition effective to substantially prevent degradation of the polymer caused by exposure to light, particularly the ultra-violet portion of the spectrum. It is a further object to provide a process for the formation of shaped articles derived from the aforesaid polymers which are stabilized against degradation caused by light.

According to one embodiment of the present invention, it has been found that remarkably stable polymer compositions may be prepared by admixing with one of the aforesaid substantially crystalline, solid, propylene polymers a stabilizing quantity of a synergistic stabilizing composition comprising a dithiocarbamate and a nickel phenolate of a thio-bis-(alkyl phenol), said dithiocarbamate having the general formula:

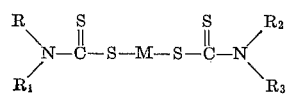

wherein M is nickel or cobalt and wherein each of R, $R_1$, $R_2$, and $R_3$ is a hydrocarbon radical having from 1 to about 18 carbon atoms. The hydrocarbon radicals may be the same or different alkyl, aralkyl, aryl, or cycloalkyl groups. For example, suitable compounds for use as a stabilizing ingredient of the compositions of this invention include: cobalt dipropyldithiocarbamate, nickel dipropyldithiocarbamate, cobalt dibutyldithiocarbamate, nickel dibutyldithiocarbamate, cobalt dihexyldithiocarbamate, nickel dihexyldithiocarbamate, cobalt dioctyldithiocarbamate, nickel dioctyldithiocarbamate, cobalt dilauryldithiocarbamate, nickel dilauryldithiocarbamate, cobalt distearyldithiocarbamate, nickel distearyldithiocarbamate, cobalt dibenzyldithiocarbamate, nickel dibenzyldithiocarbamate, cobalt dicyclohexyldithiocarbamate, nickel dicyclohexyldithiocarbamate, cobalt dicyclopentyldithiocarbamate, nickel dicyclopentyldithiocarbamate, cobalt diphenyldithiocarbamate, nickel diphenyldithiocarbamate, cobalt dinaphthyldithiocarbamate, nickel dinaphthyldithiocarbamate, cobalt ditolyldithiocarbamate, nickel ditolyldithiocarbamate and the like. Said nickel phenolate is one having the probable formula:

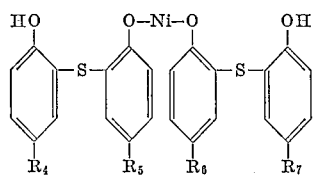

wherein each of $R_4$, $R_5$, $R_6$, and $R_7$ is an alkyl radical containing 1 to about 12 carbon atoms. Exemplary of compounds suitable for use as a stabilizing ingredient in the compositions of this invention are the nickel phenolates having the foregoing probable formula wherein R is tertiary amyl, tertiary butyl, octyl, nonyl, 2-ethylhexyl, ethyl, isododecyl, 1,3,5-trimethylhexyl, 1,1,3,3,5,5-hexamethylhexyl, and 1,1,3,3-tetramethylbutyl, the latter being preferred has the probable formula:

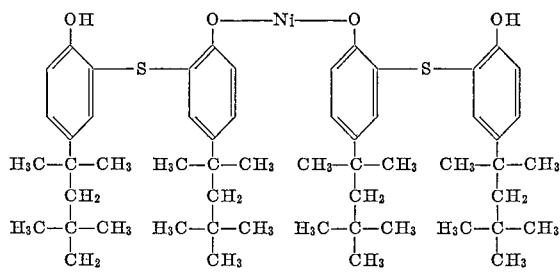

These nickel phenolates can be prepared as disclosed in Belgian Patent No. 579,636.

The use of a stabilizing quantity, e.g., from about 0.005% to about 5% by weight of each of the stabilizing ingredients of this invention, preferably about 0.1% to about 2.0% by weight of each, in combination with the propylene polymers described herein imparts remarkable stability thereto against degradation caused by exposure to light, particularly that portion of the spectrum which includes ultra-violet light.

Numerous stabilizers have been disclosed in the prior art for arresting degradation of other olefin polymers. However, it has been found that virtually none of them are useful in the propylene polymers of this invention; see page 192, volume 37, No. 5 of "Modern Plastics," January 1960. It is clear then that the probable mechanism by which the olefin polymers known heretofore degrade is entirely different from the mechanism by which the propylene polymers hereof degrade. Accordingly, the mechanism by which said propylene polymers are stabilized is unrelated to that by which other olefin polymers are stabilized.

The stabilizing ingredients may be combined with the propylene polymers hereof by any method suitable for the preparation of homogeneous mixtures. For example, the polymer may be melted and the stabilizing ingredients admixed therewith by milling on heated rolls, or by using a Banbury mixer. Alternatively, the additives may be combined, in a solid or molten state, with a solution or suspension of the polymer in a suitable liquid. In another process, one dissolves the stabilizing ingredients in a suitable solvent, admixes powdered polymer therewith, and evaporates the solvent. In another mode of operation, the solid stabilizing ingredients are thoroughly drymixed with the solid polymer. In general, it is preferable that the mixing process be carried out in the substantial absence of oxygen, e.g., in an inert atmosphere, or under vacuum, in order to prevent oxidation of the polymer.

As indicated above, it is an object of this invention to provide a process for the formation of shaped articles derived from the polymers of this invention, which shaped articles are stabilized against degradation resulting from heat or light. Said process involves intimately mixing the polymer with the synergistic combination of stabilizers to provide a homogeneous mixture thereof, heating said mixture sufficiently to melt the polymer and forming shaped articles from said melt. The mixing step may be entirely separate from the melting step, or these steps may be performed simultaneously. In a preferred embodiment the polymer and the synergistic combinations of stabilizers are mixed prior to melting; however, to insure a homogeneous mixture, mixing is continued during the melting step. For example, this preferred procedure can be performed in a conventional melt extruder by introducing a premixed polymer-stabilizer composition thereinto. The shaped articles contemplated by this invention include films, fibers, pellets and other shapes fabricated by conventional melt-extrusion, injection-molding, thermoforming, blow-molding, compression-molding, transfer-molding, powder-molding, or casting techniques.

Several criteria are used to determine the effectiveness of the stabilizers in the compositions of this invention. Since non-stabilized propylene polymers are normally drastically degraded when exposed to ultra-violet and visible light, particularly the high ultra-violet and the low visible light, the extent of this degradation is measured.

One method of determining the extent of this degradation involves the use of the Carbon-Arc Lamp Test in the Atlas Fade-Ometer substantially in the manner described in Standard Test Method 16A—1957 of the American Association of Textile Chemists and Colorists. According to this test, yarns (multifilaments) or monofilaments under tension are exposed to the light produced by a carbon arc. Every 20 hours the filaments are examined to determine whether or not the filaments are broken. If so, the test is terminated; if not the test is continued until breakage occurs. Meanwhile, at 60 hour intervals, the filaments are tested on an Instron Tensile Tester and compared with unexposed filaments. In the illustrative examples given below, the filaments (i.e., mono- or multifilaments) are wound on standard black faced "mirror" cards (6½ x 9⅓ inches) and secured thereto at the margin with cellophane tape. Winding thereof is performed using a Universal winding device at a tension of 0.75 g., and when so-wound, each card contains 3 groups of filaments having 5 to 8 monofilaments or multifilaments in each group.

The following examples are given by way of illustration and not by way of limitation, the scope of the invention being determined by the appended claims.

*Examples 1–5*

Polypropylene monofilaments were exposed in the Atlas Fade-Ometer in the manner described above giving the results tabulated below. In Table I, A designates nickel dibutyldithiocarbamate and B designates the nickel phenolate of o,o'-thio-bis-[p-(1,1,3,3-tetramethylbutyl)-phenol] described above. Non-stabilized polypropylene tested under the same conditions broke between 20 and 40 hours in the Fade-Ometer.

TABLE I

| Example | 1 | 2 | 3 | 4 | 5 |
|---|---|---|---|---|---|
| A percent by wt | 0.5 | 1.0 | 0.5 | | |
| B percent by wt | | | 0.5 | 1.0 | 0.5 |
| Denier | 142 | 133 | 127 | 139 | 139 |
| | Percent Retained Tenacity | | | | |
| Hours in Fade-Ometer: | | | | | |
| 60 | 100 | 102 | 103 | 99 | 96 |
| 120 | 96 | 99 | 95.8 | 91.5 | 58.5 |
| 180 | 97 | 96 | | 70 | |
| 240 | 101 | 112 | | 47.7 | (¹) |
| 300 | 71 | 102 | | Broken | |
| 360 | | | | | |
| 420 | Broken | | | | |
| 480 | | | | | |
| 540 | | | | | |
| 600 | | 89 | | | |
| 660 | | | | | |
| 720 | | (²) | | | |
| 780 | | | | | |
| 840 | | | | | |
| 900 | | | 35 | | |

¹ Broken 140.
² Broken 740.

The foregoing data show that the combination of the phenolate and dithiocarbamate is considerably more effective as a stabilizer than the sum of the stabilizing affects of the parts of the combination. Moreover, these data show that this combination is more effective at a given concentration than twice that amount of either of these materials individually.

*Examples 6–10*

The procedure of Example 3 is repeated using various hydrocarbon analogs of the dithiocarbamate thereof having the formula:

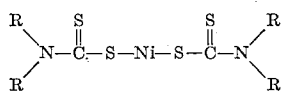

wherein R is the radical defined in Table II and wherein B is the same as in Example 3.

TABLE II

| Example: | R |
|---|---|
| 6 | n-Hexyl. |
| 7 | Cyclohexyl. |
| 8 | n-Propyl. |
| 9 | 2-ethylhexyl. |
| 10 | Lauryl. |

After 600 hours exposure in the Fade-Ometer, no broken filaments are observed.

*Examples 11–16*

The procedure of Examples 1–5 is repeated at lower concentrations resulting in the data tabulated in Table III.

TABLE III

| Example | 11 | 12 | 13 | 14 | 15 | 16 |
|---|---|---|---|---|---|---|
| A percent by wt | 0.5 | 0.20 | 0.25 | 0.30 | | |
| B percent by wt | | | 0.25 | | 0.5 | 0.25 |
| Denier | 142 | 141 | 132 | 139 | 139 | 121 |
| | Percent Retained Tenacity | | | | | |
| Hours in Fade-Ometer: | | | | | | |
| 60 | 100 | 102 | 102 | 103 | 96 | 93 |
| 120 | 96 | 94 | 120 | 103 | 58.5 | 47 |
| 180 | 97 | Broken | | 98 | Broken | Broken |
| 200 | | | 94 | Broken | 140 | 140 |
| 240 | 101 | | | | | |
| 300 | 71 | | 107 | | | |
| 400 | | | | | | |
| 420 | Broken | | | | | |
| 500 | | | 89 | | | |
| 540 | | | Broken | | | |

*Examples 17–19*

The procedure of Examples 1–5 was again repeated using higher concentrations of components to provide the data tabulated in Table IV.

TABLE IV

| Example | 17 | 18 | 19 |
|---|---|---|---|
| A percent by wt | | 1.0 | 1.0 |
| B percent by wt | 1.0 | 1.0 | |
| Denier | 132 | 133 | 133 |
| | Percent Retained Tenacity | | |
| Hours in Fade-Ometer: | | | |
| 60 | 104 | 102 | 102 |
| 120 | 95 | 115 | 99 |
| 200 | | 100 | |
| 300 | | 94 | 102 |
| 500 | (¹) | 106 | |
| 600 | | | 89 |
| 700 | | | (²) |
| 800 | | | |
| 900 | | | |
| 1,000 | | ³ 96.8 | |

¹ Broken 460.
² Broken 740.
³ Broken at 1,860.

The synergistic nature of the stabilizing composition is verified by the data in Table IV in view of the fact that the monofilaments of Example 18 are broken only after 1860 hours, whereas monofilaments containing each of the single components of this composition, illustrated by Examples 17 and 19, failed prior to 460 hours and 740 hours, respectively.

Examples 20–24

Polypropylene monofilaments were exposed in the Atlas Fade-Ometer in the manner described above giving the results tabulated below. In Table V, A designates cobalt dibutyldithiocarbamate and B designates the nickel phenolate of o,o'-thio-bis-[p-(1,1,3,3-tetramethylbutyl)-phenol] described above.

wherein R is a hydrocarbon radical as defined in Table VII.

TABLE VII

| Example: | R in Formula A |
|---|---|
| 30 | n-Hexyl. |
| 31 | Cyclohexyl. |
| 32 | n-Propyl. |
| 33 | 2-ethylhexyl. |
| 34 | Lauryl. |

TABLE V

| Example | 20 | 21 | 22 | 23 | 24 |
|---|---|---|---|---|---|
| A percent by wt | | | 0.5 | 1.0 | 0.5 |
| B percent by wt | 0.5 | 1.0 | 0.5 | | |
| Denier | 139 | 139 | 112 | 174 | 168 |
| Percent Retained Tenacity | | | | | |
| Hours in Fade-Ometer: | | | | | |
| 60 | 96 | 99 | 101 | 103 | 105 |
| 120 | 58.5 | 91.5 | 98.5 | 105 | 99 |
| 180 | Broken 140 | 70 | | | |
| 200 | | | 93 | 103 | 96.5 |
| 240 | | 47.7 | | | |
| 300 | | Broken | 93 | 92 | 55.8 |
| 360 | | | | | Broken 320 |
| 420 | | | | | |
| 500 | | | 97.5 | 61.5 | |
| 600 | | | | | |
| 700 | | | | Broken 760 | |
| 800 | | | | | |
| 900 | | | Broken | | |

The foregoing data show that the combination of the phenolate and dithiocarbamate is considerably more effective as a stabilizer than the sum of the stabilizing affects of its parts. Moreover, these data show that this combination is more effective at a given concentration than twice that amount of either of these materials individually. Nonstabilized polypropylene tested under the same conditions broke between 20 and 40 hours in the Fade-Ometer.

Examples 25–29

Polypropylene monofilaments were stabilized in substantially the same manner as in Examples 20–24, except that lower concentrations of the stabilizing ingredients were used. The results of these tests appear in Table VI.

After 500 hours in the Fade-Ometer, no broken filaments are observed.

Example 35

The procedure of Example 22 is repeated; however, there is substituted 1% by weight of each of A and B in place of the 0.5% by weight of each used in Example 22. The stabilized filaments did not break until they had been exposed in the Fade-Ometer for 1420 hours. It is evident that the synergistic affect observed in the other examples also holds true in this example, for filaments containing 1% by weight of A were broken at 760 hours (Example 23) and filaments containing 1% by weight of B were broken at 300 hours (Example 21).

TABLE VI

| Example | 25 | 26 | 27 | 28 | 29 |
|---|---|---|---|---|---|
| A percent by wt | 0.5 | 0.25 | 0.25 | | |
| B percent by wt | | | 0.25 | 0.25 | 0.5 |
| Denier | 168 | 181 | 81 | 121 | 139 |
| Percent Retained Tenacity | | | | | |
| Hours in Fade-Ometer: | | | | | |
| 60 | 105 | 102 | 103 | 93 | 96 |
| 120 | 99 | 110 | 108 | 47 | 58.5 |
| 140 | | Broken | | Broken | Broken |
| 200 | 96.5 | | 91 | | |
| 300 | 55.8 | | 71.5 | | |
| 320 | Broken | | | | |
| 380 | | | Broken | | |

Thus, the composition of Example 27 shows synergistic stabilization as compared to the stabilizers of Examples 25, 26, 28 and 29.

Examples 30–34

The procedure of Example 22 is repeated with the exception that A designates a substance having the formula:

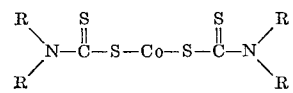

Examples 36–38

When Examples 1–5 are repeated, substituting the crystalline propylene-ethylene block copolymers I–III for the polypropylene thereof, results similar to those of Examples 1–5 are obtained.

Examples 39–41

When Examples 20–24 are repeated, substituting the crystalline propylene-ethylene block copolymers I–III for the polypropylene thereof, the results are substantially the same as those obtained in said examples.

PREPARATION OF BLOCK POLYMERS

(I)

Polymerization was carried out in accordance with the following procedure. A pressure reactor fitted with stirring means was flushed with nitrogen, and was partially filled with hexane. The catalyst, which consisted of aluminum diethyl chloride, titanium trichloride, and diethylene glycol dimethyl ether in a mol ratio of 2:1:.03 was then added in an amount such that the hexane contained 0.035 gram of titanium trichloride per 100 cc. The contents of the reactor were then brought to a temperature of 162° F., hydrogen was added in an amount of 16 parts per million by weight based on the weight of the hexane, and propylene was pressured in at 75 p.s.i.g. Polymerization of propylene commenced immediately, and was continued for 85 minutes, after which flow of pure propylene was discontinued, and a second feed, which consisted of 24% ethylene and 76% propylene, was pressured into the reactor. Polymerization was continued with this feed for 85 minutes, after which the reaction was killed by the addition of methanol. The reaction product was worked up, and a solid, highly crystalline block polymer was recovered. The total polymer contained 7.2% ethylene, as calculated from a material balance, and the solid block polymer, which amounted to 80% of the total polymer had a flow rate of 2.3, a brittle point of −13.5° C., as determined by ASTM D746–57T and a tensile impact strength as determined by ASTM 1822–62T of 94. Pure polypropylene of this flow rate has a brittle point of 14°C. and a tensile impact strength of 28.

(II)

A water jacketed polymerization reactor was charged with n-hexane, titanium trichloride, ethyl aluminum dichloride, and ethyl orthosilicate in quantities such that the hexane contained 0.07 gram of titanium trichloride per 100 cc. and the mol ratio of ethyl aluminum dichloride to titanium trichloride to ethyl orthosilicate was 2:1:0.65. The reactor contents were brought to 160° F. Hydrogen was added to the reactor in an amount of 16.5 parts per million by weight base on the weight of the hexane. The reactor was then pressured with 75 p.s.i.g. propylene partial pressure. The total pressure was 81 p.s.i.g., 6 p.s.i.g. being due to hydrogen and hexane partial pressures. Polymerization started immediately and was continued for 94 minutes while maintaining the pressure at 81 p.s.i.g. Flow of propylene was then discontinued, and a mixture of 20% ethylene and 80% propylene was introduced into the reactor at a pressure of 81 p.s.i.g. Polymerization was continued for 196 minutes with this feed stock, after which the reaction was stopped by the addition of methanol. By material balance, it was calculated that the total product recovered from the reactor, which was 83% insoluble in boiling pentane, contained 4.8% ethylene. The product, which had a flow rate of 2.4, was molded into test pieces, and the brittle point was determined by ASTM D746–57T, and tensile impact by ASTM D1822–61T. The brittle point was −4.5° C. and the tensile impact was 44. Polyethylene having a flow rate of 2.4 has a brittle point of 13° C. and a tensile impact of 28.

(III)

Copolymerization was carried out in accordance with the following procedure. A pressure reactor fitted with stirring means was flushed with nitrogen and was partially filled with hexane. The catalyst, which consisted of aluminum diethyl chloride, titanium trichloride, and diethylene glycol dimethyl ether in a mol ratio of 2:1:.03 was then added in an amount such that the hexane contained 0.035 gram of titanium trichloride per 100 cc. of hexane. The contents of the reactor were then brought to a temperature of 160° F., hydrogen was added in an amount of 20 parts per million by weight based on the weight of the hexane, and a mixture of 3 mol percent ethylene and 97% propylene was pressured in at 75 p.s.i.g. Polymerization started immediately and was continued for 12 minutes, while maintaining the pressure constant by the addition of the mixture. This feed was then discontinued and a second feed consisting of ethylene alone was pressured into the reactor for 1 minute, after which flow of the first feed to the reactor was resumed. This was repeated several times, the entire polymerization cycle being as follows:

| Feed: | Time in minutes |
|---|---|
| 1st | 20 |
| 2nd | 8 |
| 1st | 27 |
| 2nd | 15 |
| 1st | 45 |
| 2nd | 19 |
| 1st | 56 |

The reaction was terminated by the addition of methanol, and a solid crystalline propylene-ethylene block copolymer having the following characteristics was recovered: percent ethylene in the total product=11.5, flow rate=1.8, brittle point=−9.0° C., Izod impact=1.3 ft. lbs./in., tensile impact=47.3 ft. lbs./in., yield tensile strength at 1 in. per minute=3500 p.s.i. tensile strength at 1 in. per minute=4300 p.s.i., percent elongation at 1 in. per minute=376, tensile modulus=106,000 and flexural modulus=120,000.

The invention claimed is:

1. A light-stable composition comprising solid, substantially crystalline, isotactic polypropylene and a stabilizing quantity comprising from about 0.005% to about 5% by weight of each of (1) a substance having the formula:

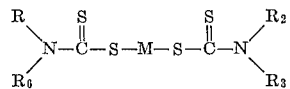

and (2) a substance having the formula:

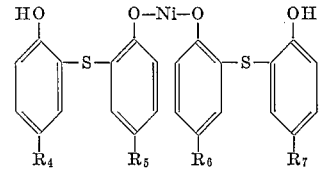

wherein M is selected from the group consisting of nickel and cobalt, each of R, $R_1$, $R_2$, and $R_3$ is an alkyl radical containing 1 to 18 carbon atoms and each of $R_4$, $R_5$, $R_6$, and $R_7$ is an alkyl radical containing 1 to 12 carbon atoms, the total quantity of substances (1) and (2) being a synergistic stabilizing quantity.

2. The composition of claim 1 wherein said stabilizing quantity is from about 0.1% to about 2% by weight of said composition.

3. The composition of claim 2 wherein one of said substances is cobalt di-n-butyldithiocarbamate.

4. The composition of claim 3 wherein each of $R_4$, $R_5$, $R_6$ and $R_7$ is tetramethylbutyl.

5. The composition of claim 2 wherein one of said substances is nickel di-n-butyldithiocarbamate.

6. The composition of claim 5 wherein each of $R_4$, $R_5$, $R_6$ and $R_7$ is tetramethylbutyl.

7. The composition of claim 2 wherein one of said substances is cobalt di-2-ethylhexyldithiocarbamate.

8. The composition of claim 2 wherein one of said substances is nickel di-2-ethylhexyldithiocarbamate.

9. The composition of claim 2 wherein one of said substances is cobalt di-n-hexyldithiocarbamate.

10. The composition of claim 2 wherein one of said substances is nickel di-n-hexyldithiocarbamate.

11. The composition of claim 2 wherein one of said substances is cobalt dilauryldithiocarbamate.

12. The composition of claim 2 wherein one of said substances is nickel dilauryldithiocarbamate.

13. A process comprising mixing a solid, substantially crystalline, polymer of propylene with a stabilizing quantity, effective to inhibit degradation of said polymer resulting from exposure thereof to light, comprising from about 0.005% to 5% by weight each of (1) a dithiocarbamate and (2) a phenolate, melting the resulting mixture, and forming from said melted mixture shaped articles having improved resistance to degradation caused by light, said dithiocarbamate having the general formula:

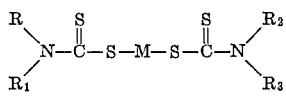

and said phenolate having the general formula:

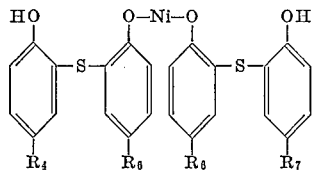

wherein M is selected from the group consisting of nickel and cobalt, each of R, $R_1$, $R_2$ and $R_3$ is an alkyl radical containing 1 to 18 carbon atoms and each of $R_4$, $R_5$, $R_6$ and $R_7$ is an alkyl radical containing 1 to 12 carbon atoms, the total quantity of substances (1) and (2) being a synergistic stabilizing quantity.

14. The process of claim 13 wherein said stabilizing quantity is from about 0.1% to about 2% by weight of said composition.

15. The process of claim 14 wherein one of said substances is nickel di-n-butyldithiocarbamate.

16. The process of claim 15 wherein each of $R_4$, $R_5$, $R_6$ and $R_7$ is tetramethylbutyl.

17. The process of claim 14 wherein one of said substances is cobalt di-n-butyldithiocarbamate.

18. The process of claim 17 wherein each of $R_4$, $R_5$, $R_6$ and $R_7$ is tetramethylbutyl.

19. The process of claim 14 wherein one of said substances is cobalt di-2-ethylhexyldithiocarbamate.

20. The process of claim 14 wherein one of said substances is nickel dilauryldithiocarbamate.

References Cited by the Examiner

UNITED STATES PATENTS

| | | | |
|---|---|---|---|
| 2,964,495 | 12/1960 | Newland et al. | 260—45.75 |
| 2,971,940 | 2/1961 | Fuchsman et al. | 260—45.75 |
| 2,972,596 | 2/1961 | Newland et al. | 260—45.75 |

FOREIGN PATENTS

| | | |
|---|---|---|
| 154,315 | 11/1953 | Australia. |
| 948,501 | 2/1964 | Great Britain. |
| 1,268,337 | 6/1961 | France. |

LEON J. BERCOVITZ, *Primary Examiner.*